United States Patent [19]

Eumurian et al.

[11] Patent Number: 4,481,676
[45] Date of Patent: Nov. 6, 1984

[54] TRANSMITTER-RECEIVER SYSTEM FOR VARIABLE-RATE DIGITAL DATA TRANSMISSION VIA OPTICAL-FIBER LINKS

[75] Inventors: Grégoire Eumurian; Robert Gadrault, both of Paris, France

[73] Assignee: Thomson-CSF, Paris, France

[21] Appl. No.: 410,707

[22] Filed: Aug. 23, 1982

[30] Foreign Application Priority Data

Aug. 21, 1981 [FR] France .................. 81 16121

[51] Int. Cl.³ ........................................ H04B 12/00
[52] U.S. Cl. ........................... 455/608; 455/617; 375/102
[58] Field of Search ............. 455/608, 617, 619, 612, 455/606, 607; 375/99, 100, 101, 102, 103, 104; 371/47

[56] References Cited

U.S. PATENT DOCUMENTS

| | | | |
|---|---|---|---|
| 3,509,279 | 4/1970 | Martin | 375/76 |
| 4,027,152 | 5/1977 | Brown et al. | 250/199 |
| 4,236,256 | 11/1980 | Brackett et al. | 455/608 |
| 4,337,457 | 6/1982 | Tache | 340/347 DD |

FOREIGN PATENT DOCUMENTS 2253336 12/1974 France .
2333387 3/1976 France .

Primary Examiner—Joseph A. Orsino, Jr.
Assistant Examiner—Timothy K. Greer
Attorney, Agent, or Firm—Oblon, Fisher, Spivak, McClelland & Maier

[57] ABSTRACT

In a data-transmission system designed for operation over a very broad temperature range and having a very large dynamic range, the receiver is of the type providing an alternating-current connection between the transimpedance circuit assembly and two comparator circuits for processing a signal which is coded at three levels. A threshold-generating circuit permits automatic switching of the thresholds among a plurality of predetermined discrete values as a function of the variation in amplitude of the signal. A circuit for inhibiting overoscillations is provided prior to transcoding. The transmitter delivers the information in the form of an internal code such as a PBP code having a constant direct-current component, and with refreshment. A delay circuit prevents overlapping of the code and refreshment pulses.

8 Claims, 11 Drawing Figures

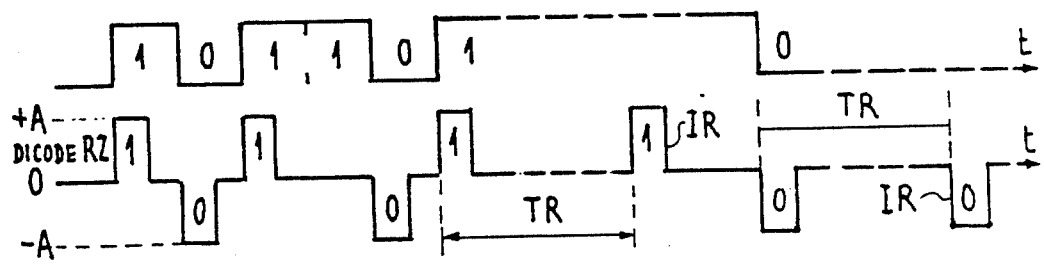
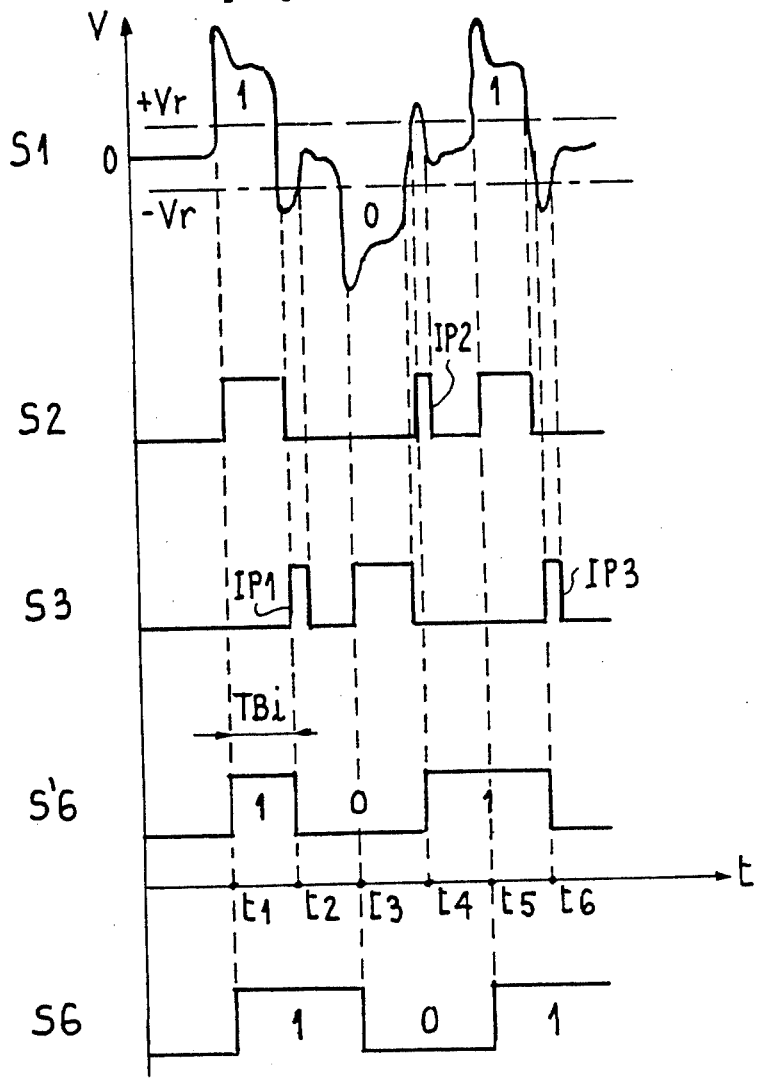

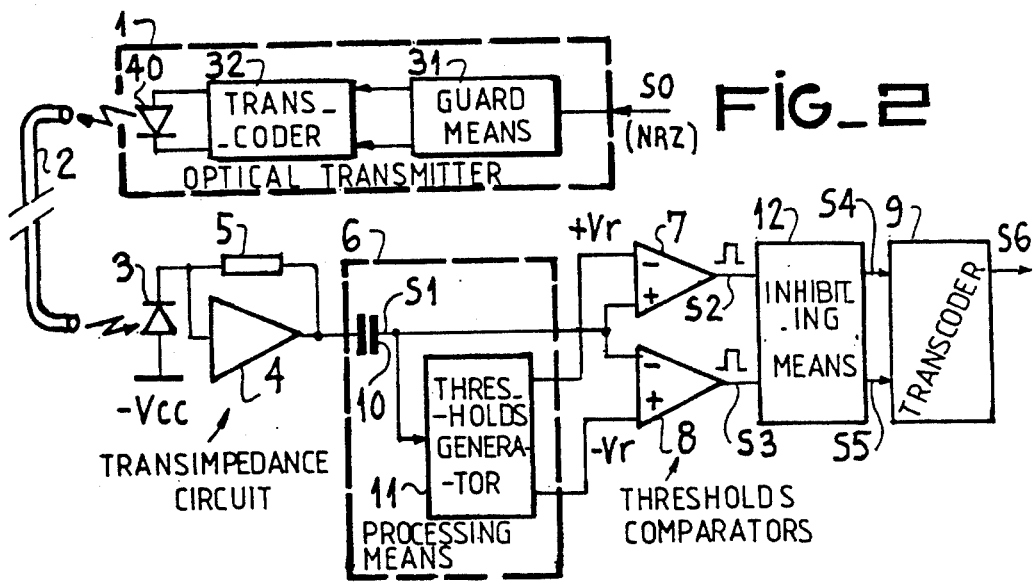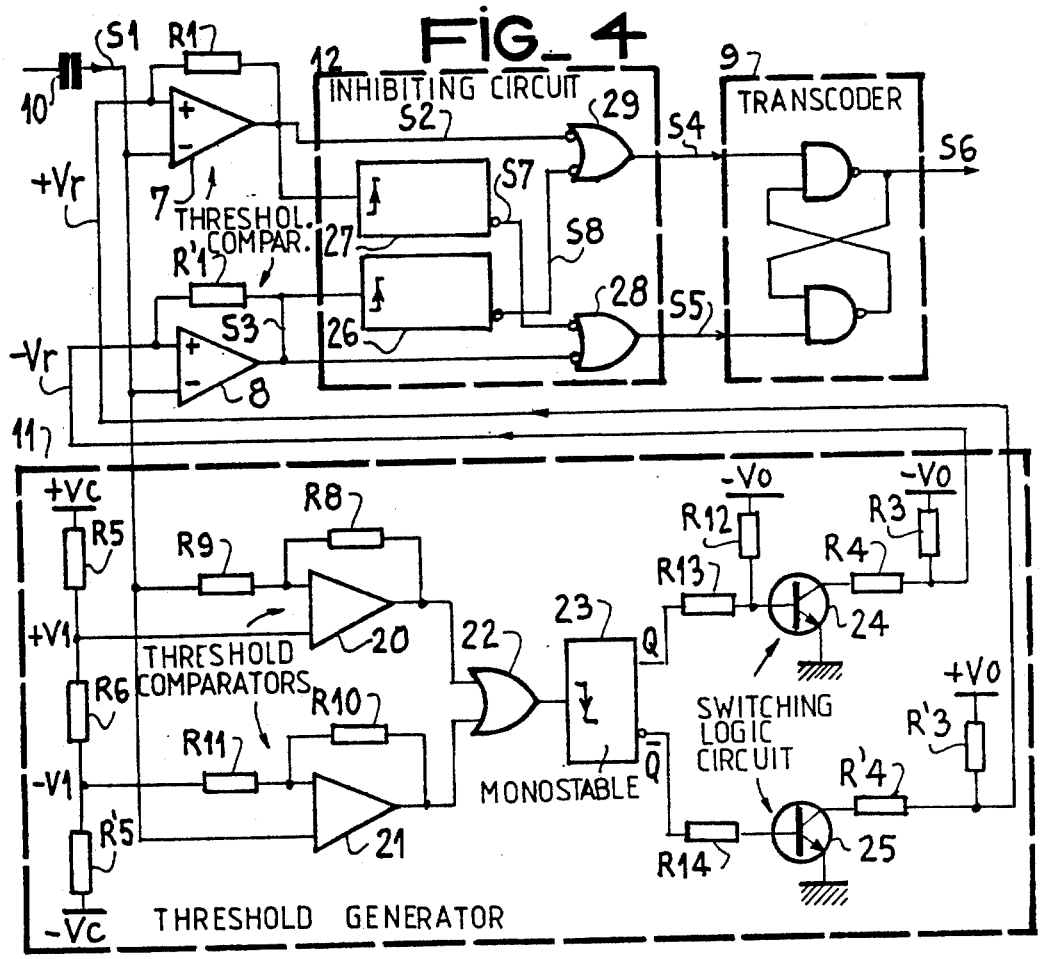

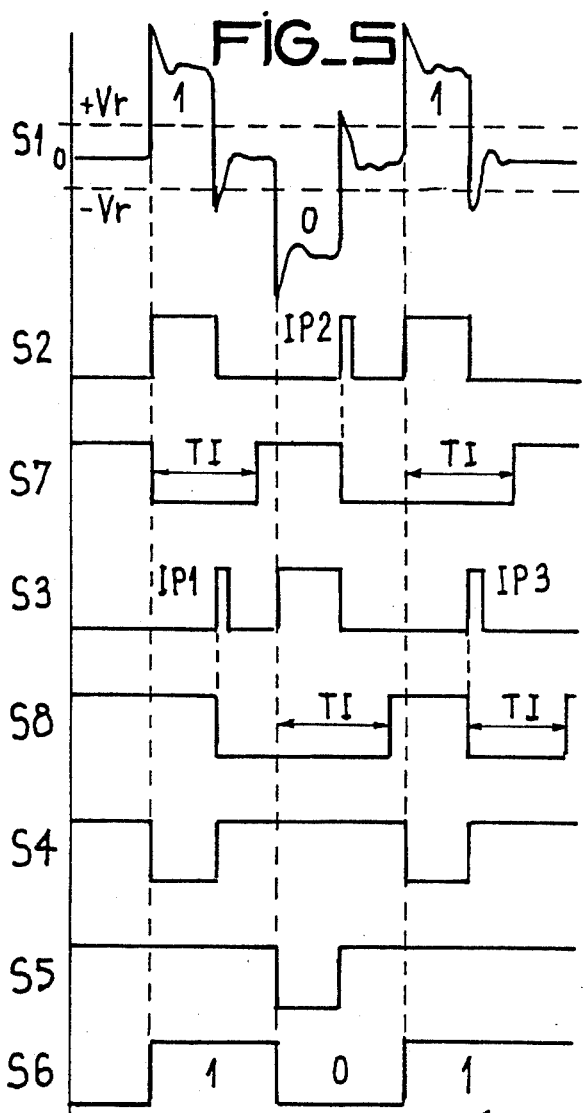
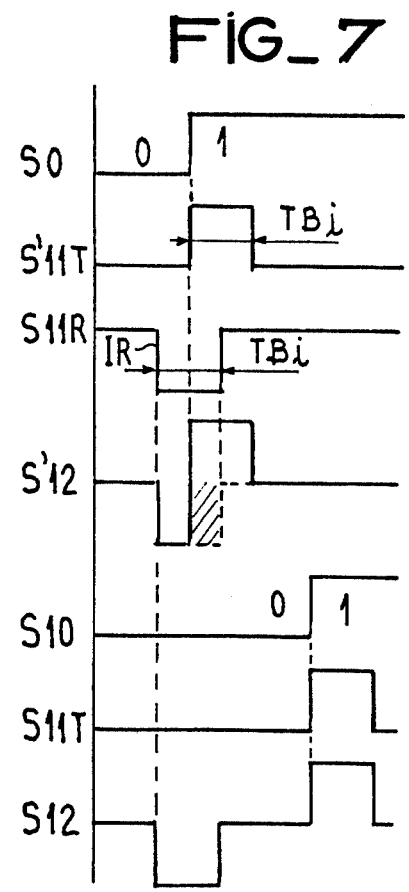
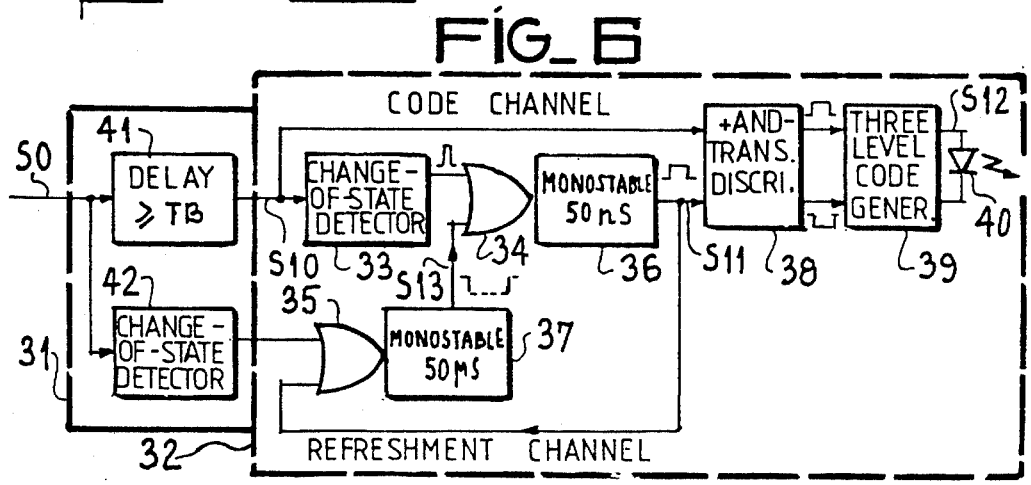

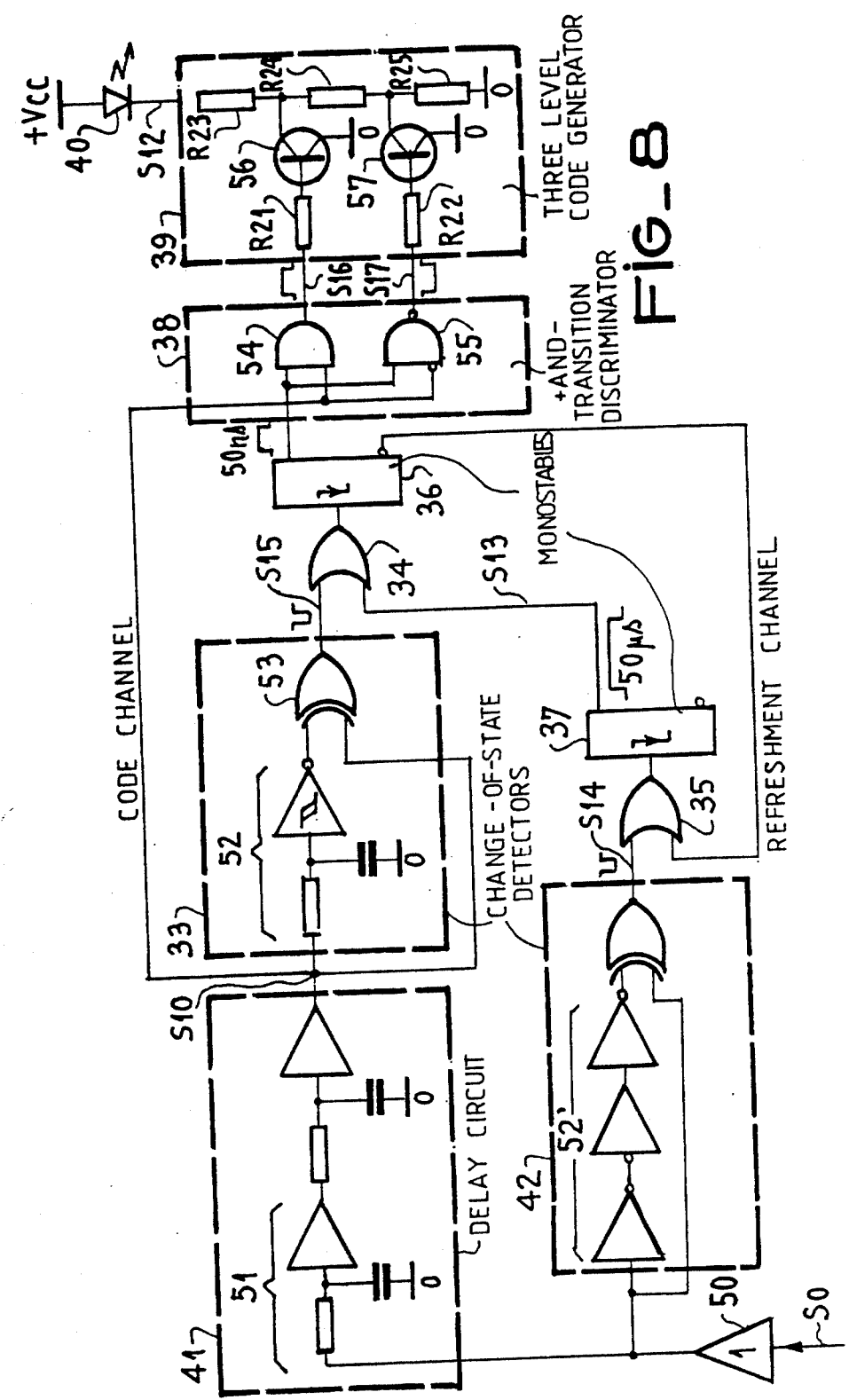

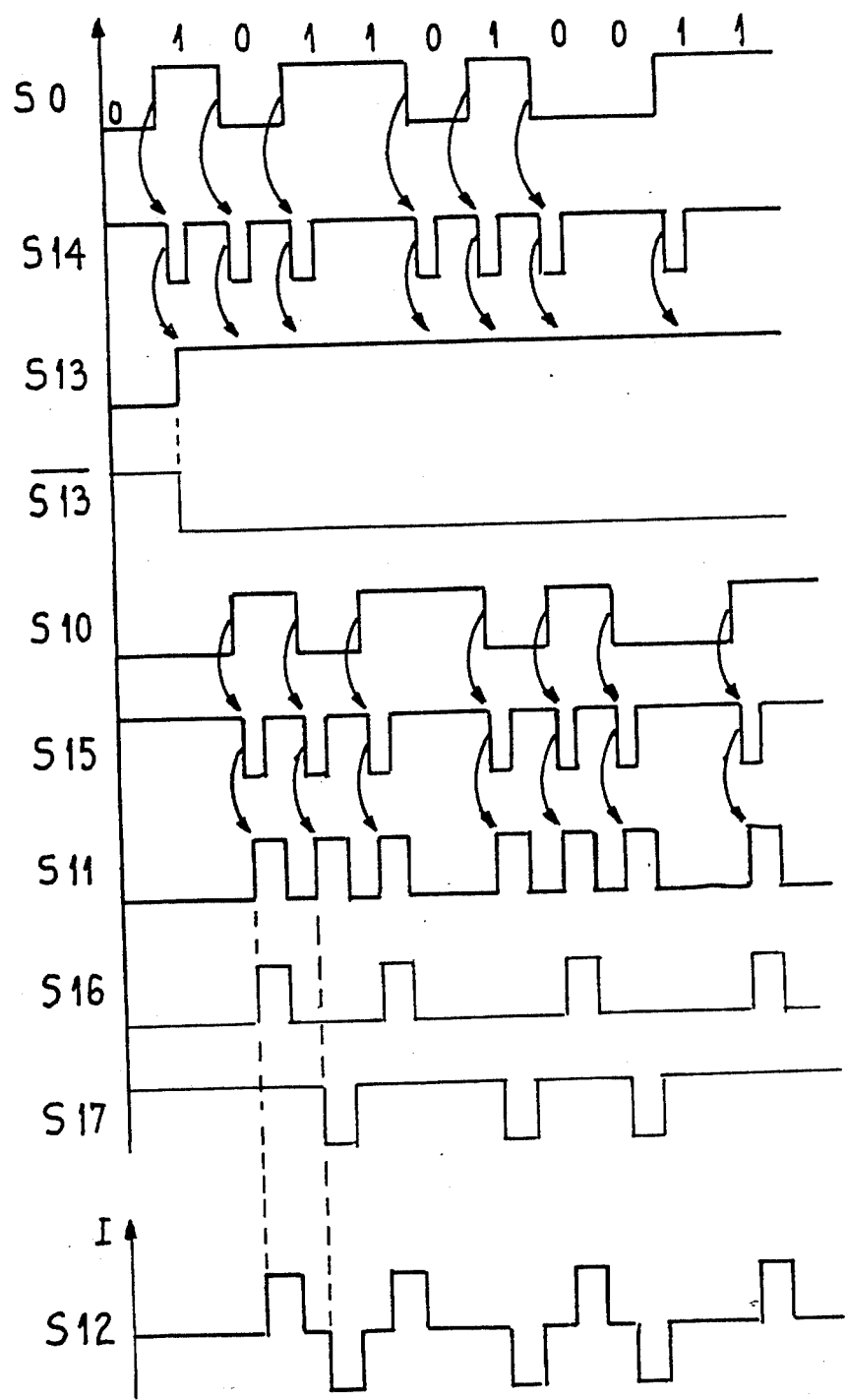

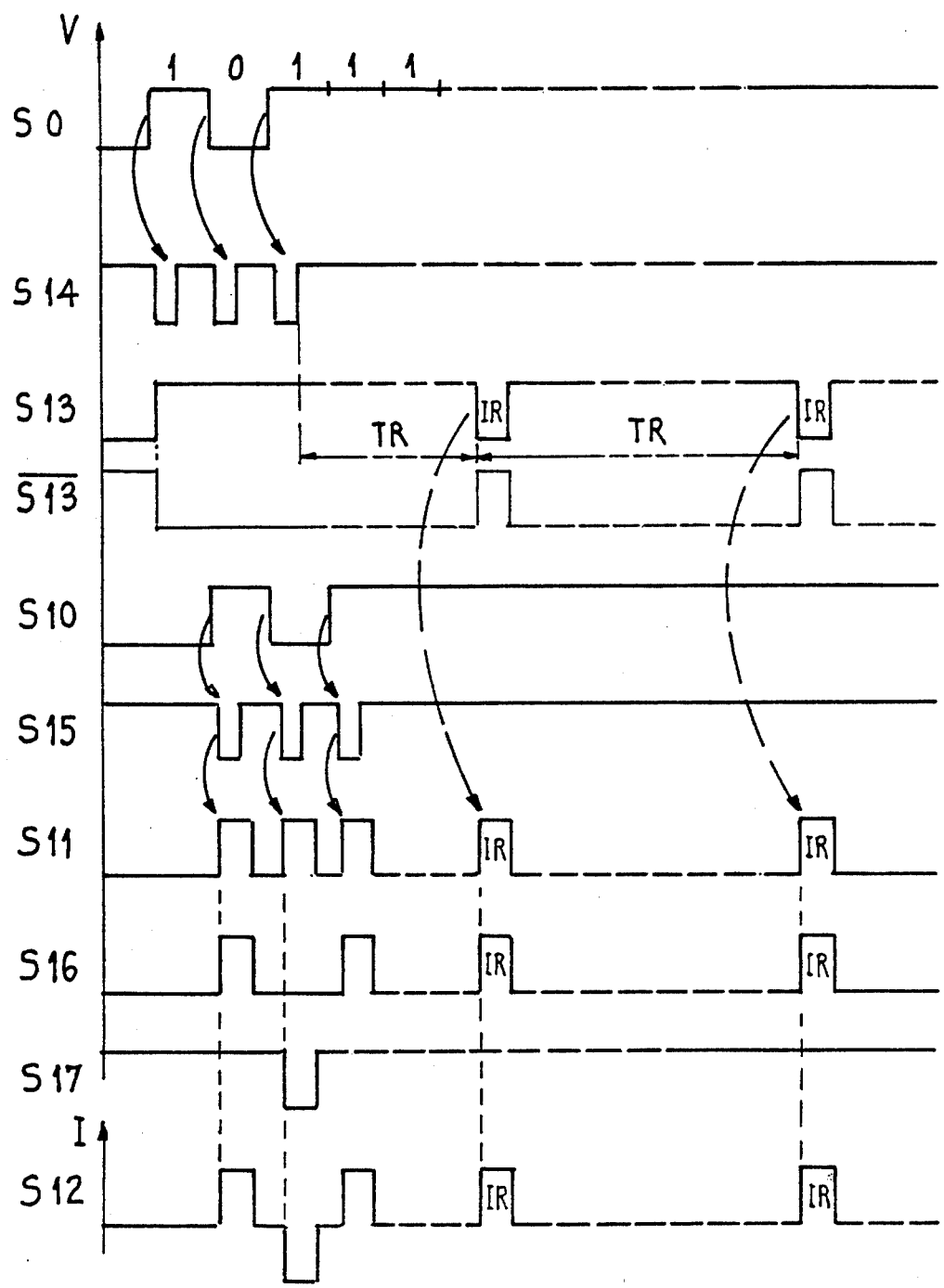

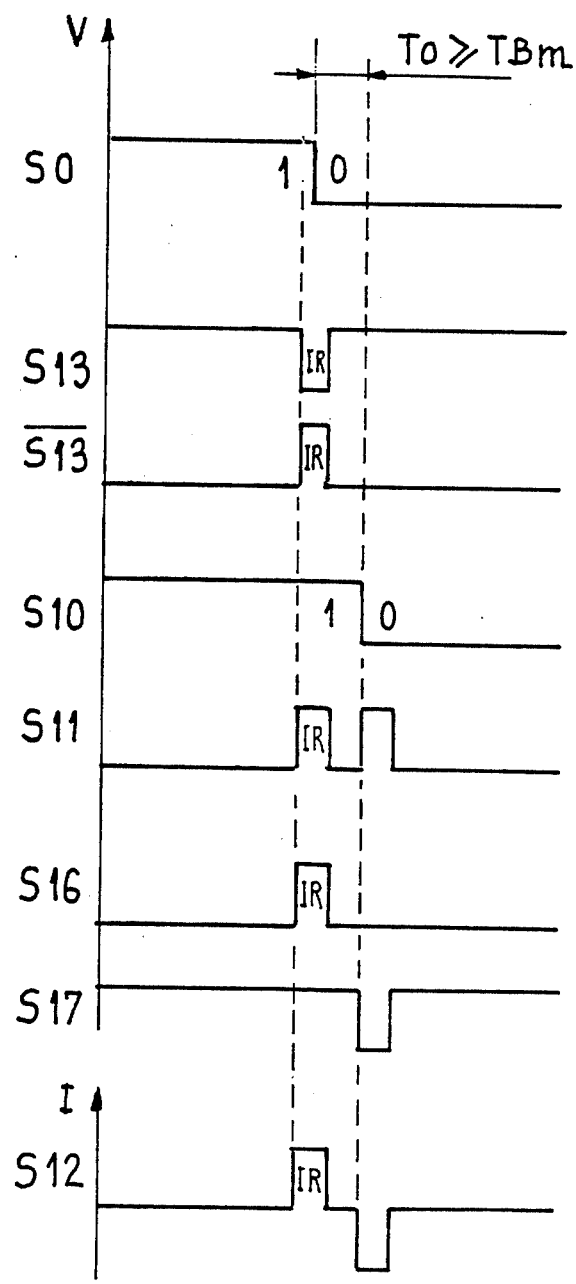

TRANSMITTER-RECEIVER SYSTEM FOR VARIABLE-RATE DIGITAL DATA TRANSMISSION VIA OPTICAL-FIBER LINKS

This invention relates to a transmitter-receiver system for variable-rate digital data transmission via optical-fiber links.

The combined use of optical fibers, high-speed optical transmitters and optical receivers leads to the development of wide-band communication links ranging from a few tens of megahertz to more than one gigahertz.

In comparison with electrical transmission systems, optical communication links offer the advantage of electrical insulation and a wide passband but are subject to the disadvantage of a transfer function which is liable to undergo appreciable variation during use, particularly under severe environmental conditions. Optical connectors are in fact extremely sensitive to mechanical tolerances and to dust particles.

Furthermore, optical fibers modify their transfer function under any action of nuclear radiations. In addition to these variations which arise from the fiber itself, modifications are also produced by the transmission and reception elements. The transmission element can be a solid-state laser or an electroluminescent diode. In both cases, the optical power/current conversion slope which characterizes these elements varies as a function of temperature and aging.

Optical reception can be carried out by means of PIN diodes or avalanche diodes. PIN diodes are stable as a function of temperature and of bias voltage. Avalanche diodes have a light sensitivity which is about one hundred times greater but are also highly sensitive, however, to temperature and voltage variations.

When the transmission system comprises a number of optical links, dispersion of the characteristics of each subassembly is added to the different causes of variations just mentioned.

The information in digital form to be transmitted through the optical fiber is obtained by adopting different methods of coding: amplitude modulation of light power, frequency or phase modulation and digital modulation. In the case of amplitude modulation, it is essential to achieve accurate determination of the different losses in order to restore the correct level at the receiving end by modifying the gain. In the case of frequency modulation, phase modulation and digital modulation, it is necessary to restore the level in an approximate manner since the dynamic range of the processing systems, although limited, can nevertheless accept certain variations in level.

Digital transmission systems exhibit in particular good tolerance for changes in the transfer function as well as noise level although this is achieved at the cost of a wider passband.

In comparison with conventional electrical transmission systems, optical digital-data transmission systems have the advantage of a wider passband (which can attain several hundred megabits/s over a distance of several kilometers) and insensitivity to electromagnetic parasites. However, insensitivity to changes in the transfer function must be much greater. Taking into account the difficulty involved in transmitting frequencies up to the direct-current component level, it is necessary to make use of codes which do not have any components towards the lower end of the spectrum.

This limitation of optical-fiber transmission links in the low-frequency region is essentially caused by the dark current of the photodiodes, the value of which is doubled at intervals of about 8° C. and rapidly becomes higher than the signal, especially in the case of optical-fiber links which achieve high attenuation.

The difficulty involved in the construction of a wide-band amplifier which passes the direct-current component is added to the difficulty just mentioned. For these different reasons, it is necessary to employ a transmission code having a zero or constant direct-current component.

Taking into account the diversity of codes employed at the present time, a transmission link which would be incapable of transmitting a specific code would consequently be of limited use. On the other hand, a universal transmission system makes it possible to transmit all transmission codes of any form, this being achieved by means of a first method of transcoding (external user code, internal code) which precedes the optical transmitter and a second method of transcoding (internal code, external user code) which follows the optical transmitter. The time-duration of each bit can thus be comprised between a minimum value (which is a function of the passband of the system) and a very high value. The transmission system thus operates as a transparent system or as a system providing a variable data rate within the range of 0 to a maximum rate of 10 Mbits/s, for example.

Aside from the possibility of accepting any external code, the use of the internal code offers an advantage in that it permits optimization of this internal code as a function of the specific properties of an optical transmission system without taking into account the constraints imposed by the external code, or user code.

The internal code adopted is a three-level code having a constant mean value. A code of this type is known as a Pulse-Bi-Polar code (PBP code) and can be compared with a differentiation of the input code. Thus only the transitions are coded (as shown in FIG. 1). A positive pulse corresponds to a 0–1 transition and a negative pulse corresponds to a 1–0 transition (or conversely). The amplitude and time-duration of each of these pulses are identical. Preferably, the pulse duration is chosen so as to be substantially equal to one-half the shortest time interval (maximum repetition rate) of the external code. As can be observed, this code has a constant mean value. Said code readily accepts bit time intervals up to infinity. However, in order to guard against parasites, if the time-duration of a "1" bit or a "0" bit of the external code exceeds a predetermined value TR (which can be chosen so as to be equal to several hundred times the minimum bit time-duration in order to maintain a substantially constant mean value), a refreshment pulse IR corresponding to the previous state is automatically produced. If the input code continues to remain in the same state, a refreshment pulse is thus automatically produced at each period TR.

In one known design which makes use of a three-level code of this type, the optical signal delivered by the transmitter is coded in the pulse-bipolar code (PBP code) and directed along an optical fiber conductor to the receiver. Said receiver is composed of an input photodiode connected to a transimpedance assembly in which an operational amplifier and a resistor are grouped together. The output of this assembly is processed in an automatic gain control circuit (designated as an AGC circuit) comprising a variable-gain amplifier controlled from its output via a low-pass filter. The gain therefore varies as a function of the direct-current component. The output of the AGC circuit is then transmitted to two fixed-threshold and symmetrical comparators in order to detect the "1" pulses of the signal in one case and the "0" pulses of the signal in the other case. An RS flip-flop then carries out transcoding in order to recover the information in NRZ (nonreturn-to-zero) binary form.

This circuit arrangement is attended by a number of disadvantages. In the first place, the reception chain up to the comparator must necessarily operate in direct-current transmission, thus entailing the need for operation within a limited temperature range by reason of the variation in dark current of the photodiode and also because of the difficulties involved in the construction of the amplifiers. Furthermore, a wide-band AGC amplifier often exhibits distortion as a function of the level of the input signal (deformation of the signal and modification of its frequency response).

In order to overcome the disadvantages of the known designs outlined in the foregoing, the transmission system can be arranged in accordance with the solution described in French Pat. No. 2,511,566 published on Feb. 18, 1983, and recalled below.

In accordance with this solution, the optical receiver is entirely designed for alternating-current transmission. With a view to permitting operation over a broad temperature range and avoiding the use of an amplifier which passes the direct-current component, the optical receiver is also designed solely for alternating-current transmission. Furthermore, the AGC circuit amplifier which is difficult to construct is replaced by a circuit in which the values of the thresholds of the comparators vary as a function of the level of the received signal.

In accordance with the design concept under consideration, the optical receiver comprises a photodiode followed by a transimpedance assembly in which the amplification has a wide passband located outside the direct-current component. The output of said amplifier is applied to the symmetrical comparators via a capacitive coupling. A circuit having the function of generating comparison thresholds and supplied from the output of the coupling capacitor makes it possible to vary the thresholds among a plurality of predetermined discrete values so as to cover a wide dynamic range of the signal.

In the case of a single switchover of the reference thresholds, the threshold generator can be designed to provide a single channel equipped with a pair of comparators having symmetrical thresholds, a logical OR gate, a monostable circuit and a transistor-type switching circuit for obtaining two pairs of reference values $\pm Vr1$ and $\pm Vr2$, depending on the amplitude of the incident signal. In the case of a wide dynamic range, it is necessary to produce more than two pairs of reference values in order to cover the range of amplitude variation of the signal. In the case of two switchover operations, that is to say three values $\pm Vr1$, $\pm Vr2$, $\pm Vr3$, the threshold generator must have two channels of the type indicated in the foregoing and so on, whereas the rest of the receiver remains unchanged.

An increase in the number of values of the reference voltage becomes essential when the input dynamic range increases by reason of the need to adopt the reference Vr at the input level. For example, in the case of an input signal which is variable between $\pm 10$ mV and $\pm 1$ V, the reference voltage can be switched-over only once between $\pm 8$ mV and $\pm 80$ mV. On the other hand, if the input signal continues to increase beyond $\pm 1$ V, the highest reference $\pm 80$ mV becomes too small with respect to the signal. If the signal attains $\pm 10$ V, for example, an overoscillation of 1% will be sufficient to produce an additional switch-over and therefore to result in erroneous decoding. Performance of the transfer function which produces an overoscillation of this low order is relatively difficult, especially if variations in temperature and as a result of aging are taken into account. In the example considered, it is therefore necessary to switch-over three reference values at least at the cost of increasing complexity of the threshold-generating circuit.

The general aim of the invention is to overcome these drawbacks by means of arrangements made in the receiver and in the transmitter of the optical-fiber link in order to eliminate the effects of overoscillations and to extend the input dynamic range, this result being achieved practically without increasing the complexity of the transmission system.

According to one object of the invention, a transmitter-receiver system for variable-rate digital data transmission via optical-fiber links comprises an optical transmitter for producing light pulses which respond to three-level internal coding with a constant direct-current component of the information to be transmitted. The coding also involves periodic emission of a refreshment pulse when the coded signal remains unchanged during a predetermined period. An optical-fiber conductor directs the light pulses to an optical receiver comprising a photodetector stage followed by a transimpedance circuit which supplies two comparators having symmetrical thresholds via a capacitive coupling. Said receiver further comprises a threshold-generating circuit for automatically switching the thresholds among a plurality of predetermined discrete values as a function of the amplitude of the signal. Said receiver is equipped downstream of the threshold comparators and prior to transcoding with means for guarding against parasitic effects of any change of state resulting from overoscillations. The transmitter is also arranged so as to eliminate any overlapping of a refreshment pulse with a pulse of the internal code of the link which produces the equivalent of a pulse with overoscillation.

These and other features of the invention will be more apparent to those skilled in the art upon consideration of the following description and accompanying drawings, wherein:

FIG. 1 is a diagram of signals which represent coding by means of the pulse-bipolar code (PBP code), starting from binary NRZ (nonreturn-to-zero) information;

FIG. 2 is a general diagram of an optical receiver employed in a transmission system according to the present invention;

FIG. 3 is a diagram of signals illustrating the parasitic effect of overoscillations which impair the information;

FIG. 4 is a partial diagram of an exemplified embodiment of an optical receiver arranged in accordance with FIG. 2;

FIG. 5 is a diagram of signals illustrating elimination of the parasitic effect of overoscillations in a receiver arranged in accordance with the invention;

FIG. 6 is a general diagram of an optical transmitter employed in a transmission system according to the invention;

FIG. 7 is a diagram of signals illustrating a case of overlapping of a refreshment pulse with a pulse of the code and suppression of overlapping in the case of a transmitter arranged in accordance with the invention;

FIG. 8 is a diagram of an exemplified embodiment of an optical transmitter arranged in accordance with FIG. 6;

FIGS. 9, 10 and 11 are diagrams of signals illustrating the operation of the transmitter in accordance with FIG. 8 respectively in the absence and in the presence of refreshment pulses and in the event of transition of the code which takes place during the time interval of a refreshment pulse.

FIG. 1 recalls coding of binary information by means of the pulse-bipolar code (PBP code). The NRZ (non-return-to-zero) binary code constitutes the external code or user code to be transcoded at the transmission end in order to form the desired three-level internal code having a constant direct-current component. Reverse transcoding at the receiving end serves to recover the NRZ binary information.

Referring to FIG. 2, the optical transmitter 1 of the variable-rate digital data transmission system delivers the signal in optical and coded form in accordance with a code having a constant direct-current component such as the PBP code, for example. The light pulses are directed to the optical receiver via the optical fiber 2.

The receiver of the type under consideration is composed of an input photodetector stage 3 which can consist of a PIN photodiode or of an avalanche photodiode and which is followed by a transimpedance circuit assembly comprising an amplifier 4 and a resistor 5. This is followed by a processing circuit 6 which precedes the symmetrical comparators 7 and 8 and the transcoding RS flip-flop 9.

The processing circuit 6 comprises on the one hand a capacitor 10 which provides a connection between the output of the amplifier 4 and the comparators 7 and 8 and, on the other hand, a circuit 11 for generating the comparison thresholds. The capacitor 10 eliminates the direct-current component and delivers the signal S1 which appears in the form of positive and negative pulses having the same amplitude and time-duration. The output of the capacitor 10 is also applied to the threshold-generating circuit 11 in order to produce values of symmetrical thresholds as a function of the amplitude of the signal. A single pair of threshold values or reference values designated as $+Vr$ in the case of the comparator 7 and as $-Vr$ in the case of the comparator 8 makes it possible to cover only a limited range of variation of the signal. In consequence, the circuit 11 acts as a decision element and makes it possible as a function of the amplitude variation of the signal to switch the threshold values so as to respond to a broad dynamic range. The variation in thresholds or reference values is non-continuous and takes place among a plurality of predetermined discrete values $\pm Vr1$, $\pm Vr2$, ... $\pm Vrn$, the number n of which is chosen in relation to the dynamic range to be covered.

According to the invention, the receiver comprises an additional circuit 12 placed between the comparators 7 and 8 and the circuit 9. The function of said additional circuit is to protect the receiver against parasitic effects of the overoscillations which can be clearly observed in FIG. 3. Random threshold-overstepping transitions resulting from overoscillations take place at the instants t2, t4 and t6. This gives rise to parasitic pulses IP1, IP2 and IP3 at the output of the comparators 7-8. If the means 12 for inhibiting overoscillations were not provided, there would consequently be obtained at the output the erroneous signal S'6 which is indicated instead of the real signal S6 corresponding to the information S1.

The function of the guard circuit or inhibiting circuit 12 is to prevent each operation of the transcoding flip-flop 9 from being followed by a second operation caused by rebounding during a pre-established time interval. The minimum bit time of the external code (time-duration of a 1 digit or 0 digit) being designated by the reference TBm, the internal code is so determined that the time-duration TBi of a 1 or a 0 pulse of said code is below the value TBm. The time interval TBi can be chosen by way of example so as to be equal approximately to one-half the value TBm. The inhibition time TI is so determined as to cover the intrinsic time-duration TBi of the internal code pulses and the intrinsic time-duration of the rebound which may take place after the trailing edge of the pulse. Furthermore, said inhibition time TI must clearly remain of shorter duration than the value TBm which represents the minimum time interval between two internal-code pulses of opposite polarity in order to avoid any loss of information relating to transition of bits corresponding to the second pulse of the internal code. The inhibition value TI can finally be defined as being comprised between the values TBi and TBm. By way of example, in the case of a maximum bit rate of 10 MB/s such that IBm = 100 ns, the value TBi can be 50 ns and the value TI can be approximately 75 ns.

FIG. 4 relates to a detailed representation of the receiver arranged with the inhibiting circuits and in the most simple case of construction of the decision circuit 11 corresponding to a single switchover of the reference values $\pm Vr$. The receiver is shown after the capacitor 10. The resistors R1, R'1 which are associated with the comparators 7 and 8 provide a hysteresis level in conjunction with the resistors of the reference voltage sources $\pm Vr$. Said hysteresis level is switched at the same time as the reference value, thus permitting of proportional operation at low and high levels. The RS transcoding flip-flop is constituted by two NAND gates connected in feedback loops. The threshold-generating circuit 11 comprises a channel formed of two threshold comparators 20 and 21 in which the positive or negative pulses designated respectively as 1 and 0 of the signal S1 derived from the capacitor 10 are compared with symmetrical levels $+V1$ and $-V1$ respectively. The comparison outputs are applied via an OR gate 22 to a retriggerable monostable device 23. The output Q of said monostable device and its complementary output $\overline{Q}$ drive two switching circuits comprising transistors 24 and 25 and resistors in order to achieve switching of the reference levels $\pm Vr$ between $\pm Vo$ to $\pm Vo$ R4/R3+R4, or conversely.

The guard circuit 12 is constituted by two monostable devices 26 and 27 and two NAND gates 28 and 29. The monostable devices are triggered on the leading edges of the pulses which are present on the outputs of the threshold comparators 7 and 8 and operate during a time interval corresponding to the inhibition period TI defined earlier. The gates 28 and 29 which receive respectively a comparison output and a monostable-circuit output serve to turn-off the transcoding flip-flop 9 during a time interval TI at each pulse of the internal code and thus to suppress random triggering caused by overoscillations.

FIG. 5 illustrates the operation of the receiver which is thus equipped with inhibiting means 12 and gives rise to parasitic pulses IP1 to IP3 (signals S2, S3) in the presence of overoscillations, said pulses being detected by the comparators 7 and 8. The restituted signal S6 corresponds exactly to the information transmitted by the link.

The operation of this receiver is correct in the case of medium and high transmission rates in which an emission of a refreshment pulse IR (shown in FIG. 1) does not take place. In the case of lower rates which become lower than the refreshment rate TR, there is a potential danger of simultaneous emission of a refreshment pulse and of a normal pulse of the internal code. In this case, the emitted pulse which contains a positive pulse immediately followed by a negative pulse or conversely is processed by the receiver as a pulse with overoscillation. The code pulse will be eliminated, thus resulting in poor operation at the decoding level. In fact, it is this second portion of the signal which represents the order of change of state and it is precisely this order which is suppressed. This operation is illustrated in FIG. 7 by the first four signals, namely the signal SO corresponding to the NRZ external code, the transcoded signal S'11T, a refreshment pulse S11R which overlaps the transition of the code and the resultant signal S'12.

In order to ensure correct operation, the transmitter is provided with a complementary circuit 31 which eliminates this possibility of overlap.

FIG. 6 illustrates a transmitter of this type in which the downstream portion 32 of the block 31 produces the desired transcoding of the external code SO to a three-level internal code S12. In a version not equipped with the means 31, the transmitter would consist of the portion 32 in which the output of the circuit 33 for detecting a change of state of the signal SO would supply both OR gates 34 and 35 at the same time. Detection of a change of state produces a pulse at each 1–0 or 0–1 transition of the input signal. The OR gate 34 is followed by a monostable device 36 having a time-duration equal to the duration TBi of the internal-code pulses which may be 50 ns, for example. The OR gate 35 is followed by a retriggerable monostable device 37 having a duration equal to the refreshment time interval TR such as 50 µs, for example. The output S11 is applied to the second input of the gate 35 and the output S13 of the monostable device 37 is applied to the second input of the gate 34. The output S13 is continuously in state 0 as long as the transitions of the external code SO follow each other with a period shorter than TR. If the external code does not change during this period, the signal S13 changes over to 1 and, by means of the circuits 34 and 36, initiates the production of a refreshment pulse IR and, by means of the feedback loop 36 to 35, initiates retriggering of the monostable device 37 for a further period TR. Thus, if the external code SO remains unchanged, the assembly 34 to 37 behaves as an oscillator having a period TR. The output of the monostable device 36 as well as the external code drive a discrimination circuit 38 which discriminates or identifies positive transitions and negative transitions. To this end, said circuit 38 has two outputs, one output being intended to deliver a positive pulse at each transition of the external code from 0 to 1 and the other output being intended to deliver a negative pulse at each transition of the same code from 1 to 0.

A circuit 39 then makes it possible to deliver the three-level code which is applied to the emission diode 40 in the form of three currents Io (quiescent state), Imin (transition from 1 to 0) and Imax (transition from 0 to 1). The value Io is equal to the mean value of the extreme values, that is, Imax−Io=Io−Imin. The duration of the negative and positive pulses is otherwise identical.

The circuit assembly 32 of FIG. 6 is therefore attended by a danger of overlapping between the internal code and the refreshment pulse illustrated in FIG. 7. The refreshment operation (S11R) begins just before the transition from 0 to 1 (S'11T). At the instant of occurrence of this transition, the refreshment is abandoned in favor of the code, thereby generating a truncated negative pulse followed by a normal positive pulse (S'12). In the event of coincidence between a transition of the external code from 1 to 0 and of a refreshment pulse, the truncated signal is identical but of opposite polarity. In order to prevent these truncated pulses from generating false codes at the level of the receiver (this being similar to the effect produced by overoscillations), the invention provides for the introduction of a time-delay in the channel which produces the three-level code with respect to the refreshment channel (signals S10, S11T and S12 of FIG. 7).

The complementary portion 31 therefore comprises a circuit 41 for delaying the signal SO and a second change-of-state detection circuit 42 for maintaining the supply of the OR gate 35 of the refreshment channel starting from the non-delayed information SO. The time-delay introduced by the circuit 1 must be longer or at least equal to the minimum bit time TBm of the external code.

FIG. 8 corresponds to a detailed diagram of one example of embodiment of the transmitter as designed in accordance with the foregoing arrangements.

The delay circuit 41 which prevents overlapping between the refreshment pulse and the code is constructed from two cells each composed (as in the case of the cell 51) of a low-pass filter and of a Schmitt trigger. This delay circuit is given by way of indication since any other suitable device may be contemplated, such as a delay line, a series of logic circuit inverters, and so on. The change-of-state detection circuits 33 and 44 are constituted by logical differentiators comprising a delay circuit (composed of a low-pass filter followed by a Schmitt trigger 52 or of a series of logical inverters 52', or any other suitable circuit) associated with an exclusive-OR gate such as the gate 53. At each transition from 0 to 1 and from 1 to 0, this device delivers a pulse having a width which is equal to the time-delay of the circuit 52 and may have a value of 30 ns, for example, in respect of a value TBi of 50 ns. Discrimination of positive or negative transitions is carried out by the gates 54 and 55 by combining the output pulse of the monostable device 36 with the delayed input code S10. These gates deliver positive and negative pulses corresponding respectively to the 0 to 1 and 1 to 0 transitions.

These pulses are applied via the resistors R21 and R22 to the transistors 56 and 57 which are designed for switching operation. By means of a network of resistors R23, R24, R25 placed in series with the emission diode 40, said switching transistors 56 and 57 serve to direct into said diode the three-level current Io, Imin and Imax which corresponds to the characteristics mentioned earlier. The switching circuit 39 is given by way of example. Any other device for obtaining three current levels would be equally suitable. In the case of the device presented, the different resistors must satisfy the following relations:

$$\frac{R25}{R24} = \frac{1+k}{1-k}, \frac{R24}{R23} = k \text{ and } Io = \frac{Vcc - VD}{R23 + R24} \text{ with}$$

$$k = \frac{Imax - Io}{Io} = \frac{Io - Imin}{Io}, \text{ and } VD = \text{voltage drop of}$$

the emission diode 40.

FIGS. 9, 10 and 11 are waveform diagrams of the signals at different points of the circuit of the transmitter which is shown in FIG. 8 in different cases of operation.

FIG. 9 represents the waveforms of these different signals, from the external code to the internal code in the absence of refreshment (corresponding to the case in which the period between two bits of the code remains shorter than or equal to TR).

FIG. 10 shows the same signals but with generation of refreshment pulses IR (in this case, the period between two bits of the code becomes equal to or longer than TR).

FIG. 11 shows the operation of the transmitter in the presence of a change of code which takes place at the same instant as the generation of a refreshment pulse TR. The time-delay To between the code channel and the refreshment channel makes it possible in this case to prevent overlapping of the two pulses.

In the foregoing description, the system for the transmission of digital data by means of an optical-fiber link as proposed in the present invention constitutes an alternative form of construction with respect to the system described in the prior French Pat. No. 2,511,566 published on Feb. 18, 1983. With a view to increasing the volume range, the design solution described in said prior patent Application is confined to the level of the receiver and leads to the construction of a threshold-generating circuit which is more and more complex. In the variant proposed by the present invention, the means 12 for inhibiting the effects of overoscillations caused by modification of the transfer function of the optical link permits an appreciable increase in the volume range by virtue of the fact that the ratio between two consecutive reference values can be increased. By making use of said inhibiting means, it is also possible to achieve substantial simplification of the decision circuit in respect of a given volume range. It is necessary, however, to make provision at the level of the transmitter for a simple protection device 31 in order to produce a time-lag between the code channel and the refreshment channel and to prevent overlapping between a refreshment pulse and a transition pulse. This is a highly desirable objective by reason of the fact that this overlapping produces a signal which is similar to a normal signal but is accompanied by over-oscillation, thus initiating the operation of the inhibiting circuit of the receiver. This in turn results in faulty decoding since the pulse corresponding to transition of the external code is not taken into account. Depending on the design characteristics laid down for operation of the system, it may be found necessary to opt either for the solution described in the prior patent Application aforesaid or for the solution according to the present invention.

What is claimed is:

1. A transmitter-receiver system for variable-rate digital data transmission via optical-fiber links, comprising; an optical transmitter for producing light pulses corresponding to three-level internal coding having a constant direct-current component of the information and also involving periodic emission of a so-called refreshment pulse when the coded signal remains unchanged during a predetermined period; an optical fiber conductor for directing the light pulses to an optical receiver which includes a photodetector stage followed by a transimpedance circuit said transimpedance circuit connected to a capacitive coupling having an output, said output supplying two comparators having symmetrical thresholds and a threshold generator for automatically switching said thresholds among a plurality of predetermined discrete values as a function of the amplitude of the signal; and a transcoding circuit supplied from the comparison outputs, wherein said receiver further comprises means for guarding against the parasitic effects of changes of state resulting from overoscillation, said means being constituted by an inhibiting circuit which is interposed between the comparators and the transcoding circuit and which inhibits said transcoding circuit as a result of each internal-code pulse detected by the comparators, inhibition being produced during a time interval so determined as to cover all possible rebounds which may follow the pulse.

2. A system according to claim 1, wherein the inhibiting circuit is composed of two monostable circuits and two gate circuits, the time-duration of the monostable circuit being equal to that of the inhibiting circuit and being between the internal code pulse time and the minimum bit time of the binary information to be transmitted.

3. A system according to claim 2, wherein the output of a first threshold comparator is connected to one input of a first NAND gate having two inputs and to a first monostable circuit, the second threshold comparator being similarly connected to the second NAND gate and to the second monostable circuit, the output of the first monostable circuit being applied to the second input of the second NAND gate, and the output of the second monostable circuit being connected to the second input of the first NAND gate.

4. A system according to any one of the preceding claims, wherein the transmitter comprises a means for guarding against the effects which are produced by overlapping of a refreshment pulse with an information pulse which results in errors at the time of decoding, said means being constituted by a circuit at the input of the transmitter in order to produce a displacement in time between the internal pulse and the refreshment pulse.

5. A system according to claim 4 and in which, in order to produce a pulse-bipolar code (PBP code) for coding the information to be transmitted, the transmitter comprises a first change-of-state detection circuit in order to produce a pulse of short duration at the time of each transition of the information, the change-of-state pulses being applied respectively to a code channel for producing the PBP code pulses and to a refreshment channel for producing the refreshment pulses, wherein the guard circuit at the input of the transmitter comprises a delay circuit for delaying the binary information to be sent to the code channel by a quantity at least equal to the minimum bit time of said information, and wherein a second change-of-state detector circuit is provided for supplying the refreshment channel without delay, the first change-of-state detector being intended to supply the code channel alone.

6. A system according to claim 5, wherein the delay circuit is formed by cells each composed of a low-pass filter followed by a Schmitt trigger circuit.

7. A system according to claim 5, wherein the delay circuit is formed by a series of logic inverter circuits.

8. A system according to claim 5, wherein each channel of the transmitter comprises a monostable circuit driven by the corresponding change-of-state detector circuit via a gate having two inputs, the output of each monostable circuit being connected to the second input of the gate circuit of the other channel, the time-duration of the monostable circuit of the code channel being equal to the duration of the PBP code pulse and the time-duration of the monostable circuit of the refreshment channel being equal to the refreshment period, the transmitter being further provided with a circuit for discriminating positive and negative transitions, said discriminating circuit being supplied by the delayed information and by the output of the monostable circuit of the code channel and being connected in series with a three-level internal coding circuit which supplies a light-emitting diode.

* * * * *